US008917734B1

(12) United States Patent
Brown

(10) Patent No.: US 8,917,734 B1
(45) Date of Patent: Dec. 23, 2014

(54) METHOD AND APPARATUS FOR AN AGGREGATED NON-TRANSPARENT REQUESTER ID TRANSLATION FOR A PCIE SWITCH

(71) Applicant: PMC-Sierra US, Inc., Sunnyvale, CA (US)

(72) Inventor: David Alan Brown, Carp (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/681,257

(22) Filed: Nov. 19, 2012

(51) Int. Cl.
*H04L 12/28* (2006.01)
*H04L 12/54* (2013.01)
*H04L 12/40* (2006.01)

(52) U.S. Cl.
CPC ............. *H04L 12/56* (2013.01); *H04L 12/40* (2013.01)
USPC ....................................................... 370/400

(58) Field of Classification Search
CPC ............................................ H04L 2012/40208
USPC .................................. 370/389, 400, 401, 402
See application file for complete search history.

(56) References Cited

U.S. PATENT DOCUMENTS

| 7,457,906 B2* | 11/2008 | Pettey et al. ................. 710/316 |
| 7,694,047 B1* | 4/2010 | Alston ............................ 710/62 |
| 7,752,346 B2* | 7/2010 | Talayco et al. ................... 710/9 |
| 2006/0282603 A1* | 12/2006 | Onufryk et al. ............... 710/312 |
| 2011/0225341 A1* | 9/2011 | Satoh et al. ................... 710/314 |

* cited by examiner

*Primary Examiner* — Derrick Ferris
*Assistant Examiner* — Sasha Cintron Pacheco
(74) *Attorney, Agent, or Firm* — Kenneth Glass; Molly Sauter; Glass & Associates

(57) ABSTRACT

A system and method are disclosed for aggregated non-transparent requester ID translation in a PCIe switch. The system may include a first switch that is enabled to receive a request from a non-transparent port of a second switch at an aggregated downstream port of the first switch and translating the requester ID of the request at the first switch using the aggregated switch number and the captured bus number of the requester ID. The method may include receiving a request from a non-transparent port of a second switch at an aggregated downstream port of a first switch and translating the requester ID of the request at the first switch using the aggregated switch number and the captured bus number of the requester ID.

19 Claims, 8 Drawing Sheets

METHOD AND APPARATUS FOR AN AGGREGATED NON-TRANSPARENT REQUESTER ID TRANSLATION FOR A PCIE SWITCH

BACKGROUND OF THE INVENTION

Peripheral Component Interconnect Express (PCIe) is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, a PCI Express switch, and various external devices. In a PCIe switch, transaction layer packets are routed between requesters and completers utilizing requests generated by the requesters and completions generator by the completer in response to the request.

PCI Express standards define the transmission of transaction layer packets (TLPs) between a root complex and various endpoints connected to external devices. In standard PCIe, there is only one root complex (RC) at the top of the hierarchy and the root complex assigns addresses and requester IDs to the other functions (i.e. endpoints, bridges, etc.) of the hierarchy. In accordance with the PCIe standard, non-posted requests are routed by address and their completions are routed by requester ID.

In the case of multiple root complexes in a PCIe system, in order to route between two or more root complexes, and thus their PCIe hierarchies, non-transparent bridging is required. Non-transparent bridging is a non-standard method of translating a transaction layer packet (TLP) from one PCI Express domain to another PCI Express domain. Non-transparent bridging between two or more domains requires mapping of the address and requester ID (REQID). In non-transparent bridging only the request has its address translated because there is no address field in the completion. Additionally, both the request and the completion of the routed TLP require the translation of the REQID field.

In the case of multiple root complexes in a PCIe system, each root complex may be coupled to a PCIe switch and each of the PCIe switches may be coupled together to implement a PCIe system having multiple root complexes. The PCIe switch may be coupled together in a cascaded or tree topology, or a combination thereof. In order to accommodate multiple root complexes in one PCIe system, each of the PCIe switches must store a requester ID (REQID) table having an entry for each requester directly connected to the switch itself and for each of the requesters connected to the other downstream PCIe switches in the hierarchy. Such a configuration requires a very large lookup table, which is undesirable due to the large integrated circuit embedded memory required to store the table.

Additionally, emerging applications for solid state drives using I/O virtualization require a large number of requester IDs to be translated by a non-transparent port of a PCIe switch. The table size required to store the requester IDs for these applications is pushing the practical limits of ASIC technology. PCIe switches are often coupled together in a cascaded topological hierarchy to accommodate multiple solid state drives. In this topology, the PCIe switch that is positioned at the top of the hierarchy must store requester ID entries in the lookup table for not only locally attached endpoints, but also for all endpoints attaches to switches below in the hierarchy. As such, the required storage for the table increases as the number of cascaded PCIe switches increases to accommodate the solid state drives. This large lookup table is undesirable due to the large integrated circuit embedded memory required to store the table.

Thus, there is a need for a method and apparatus that will reduce the size of the requester ID lookup table in a PCIe switch implementing non-transparent bridging. Accordingly, what is needed in the art is an improved requester ID lookup table having a reduced number of table entries, therefore requiring a reduced amount of memory storage, for use in a PCIe non-transparent bridging switch to accommodate multiple root complexes.

SUMMARY OF THE INVENTION

The present invention provides a system and method for an aggregated non-transparent requester ID translation in a switch for addressing a PCIe system employing multiple root complexes. In a particular embodiment, the switch may be a PCIe switch operating in a PCIe switch fabric topology.

A method of the present invention for aggregated non-transparent requester ID translation in a switch may include, receiving a request from a non-transparent port of a second switch at an aggregated downstream port of a first switch, the request comprising a requester ID and the requester ID further comprising a captured bus number of a non-transparent port of the first switch and an aggregated switch number associated with the second switch and translating the requester ID of the request received at the first switch using the aggregated switch number and the captured bus number.

If the requests are received from a locally attached endpoint instead of from a non-transparent port of a second switch, the method may further include, receiving a request from an endpoint locally attached to the first switch at a non-aggregated downstream port of the first switch, the request comprising a requester ID and the requester ID further comprising a captured bus number, a device number and a function number and translating the requester ID of the request from the locally attached endpoint using the captured bus number, the device number and the function number.

If a completion is required in response to the request, the completion may be routed by requester ID and the method may further include, receiving a completion at the non-transparent port of the first switch, the completion comprising a requester ID and the requester ID further comprising the aggregated switch number and translating the requester ID of the completion by indexing a requester ID match table if the aggregated switch number identifies the first switch as the target of the completion, or translating the requester ID of the completion by indexing a bus mapping table if the aggregated switch number does not identify the first switch as the target of the completion.

A switch for performing the method of aggregated non-transparent requester ID translation as described above, may include an aggregated downstream port configured to receive a request from a non-transparent port of another switch within a switch hierarchy of the switch, the request comprising a requester ID and the requester ID further comprising an aggregated switch number and a non-transparent port of the switch configured to translate the requester ID of the request received at the aggregated downstream port of the switch using the aggregated switch number and a captured bus number of the non-transparent port of the switch.

The switch may be a PCIe switch and the switch hierarchy may comprise a plurality of switches coupled together in a cascaded topology or a tree topology or other combinations and variations of topologies known in the art.

A system for performing aggregated non-transparent requester ID translation, as described, may include at least at first switch and a second switch within a switch hierarchy, the first switch comprising an aggregated downstream port configured to receive a request from a non-transparent port of the second switch, the request comprising a requester ID and the requester ID further comprising an aggregated switch number and a non-transparent port of the first switch configured to translate the requester ID of the request received at the aggregated downstream port of the first switch using the aggregated switch number and a captured bus number of the non-transparent port of the first switch.

The switches of the system may be a PCIe switches and the switches may be coupled together in a cascaded topology or a tree topology or other combinations and variations of topologies known in the art.

These and other advantages of the present invention will become obvious to those of ordinary skill in the art after having read the following detailed description of the preferred embodiments, which are illustrated in the various drawing figures.

DETAILED DESCRIPTION

Figure 1:
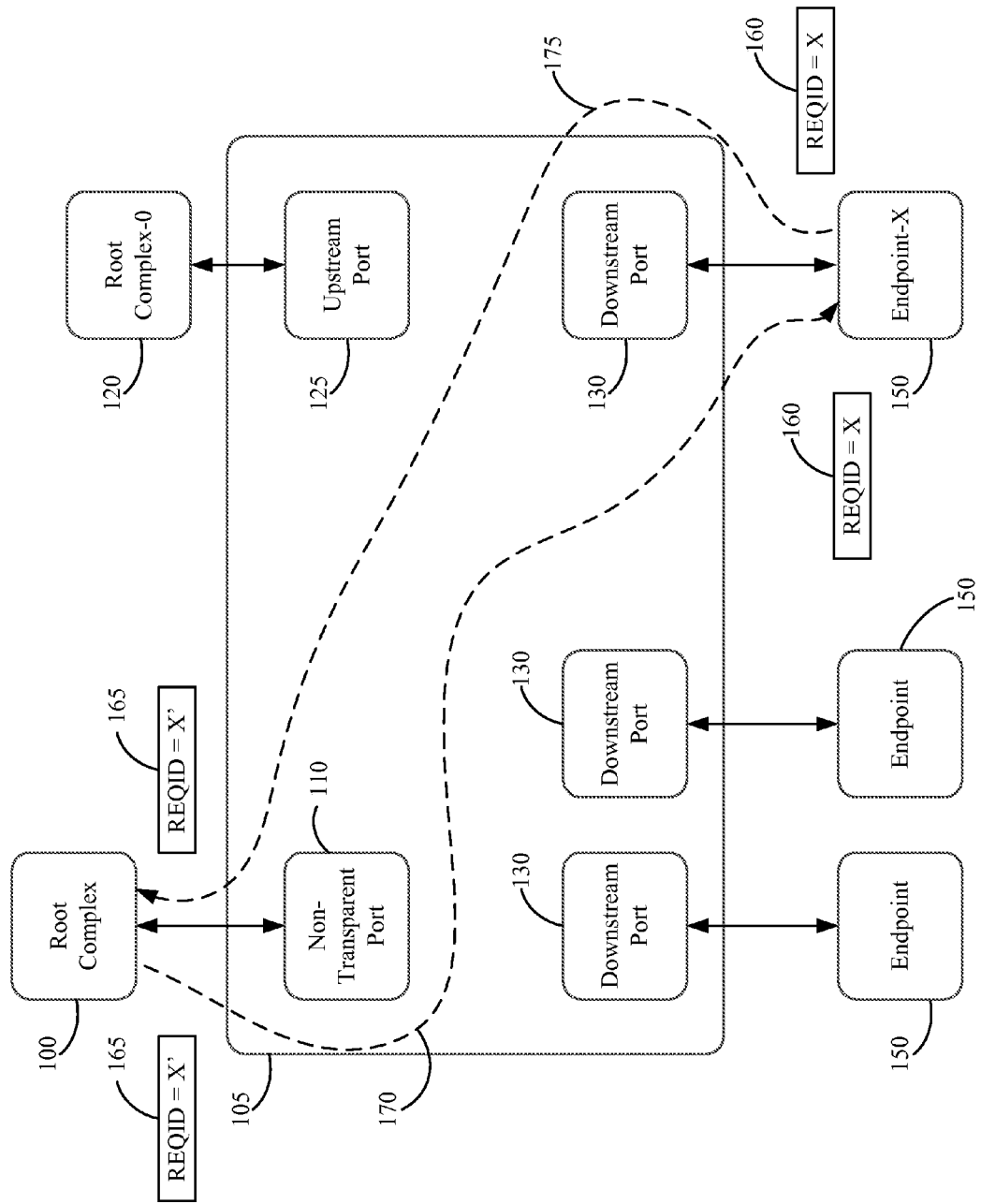
FIG. 1 is a diagram illustrating a PCIe switch having a non-transparent port in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The present invention is applicable to a general or special purpose computing system wherein multiple root complexes are coupled to a central processing unit and are sharing a group of input/output devices through a common switch fabric. More specifically, the exemplary embodiments described herein are related to a routing mechanism for routing data when the switch fabric utilizes a PCI Express (PCIe) protocol.

In order to route transaction layer packets between the two root complexes, and thus through their PCIe hierarchies, non-transparent bridging is required. Non-transparent bridging with multiple root complexes may be used to support various applications, such as mirroring for storage applications, dual-host/failover for embedded and communications systems and fabric interfaces for intelligent adapters. Various non-transparent bridging architectures are known in the art. In a first architecture, the non-transparent function may be performed at an upstream port of the switch. In an additional architecture, a non-transparent port may exist on a virtual bus of the switch. Regardless of the architecture employed for non-transparent bridging, all transaction layer packets (TLPs) that flow through a non-transparent port/function will undergo an address translation and a requester ID (REQID) translation utilizing a requester ID (REQID) translation table of the switch. The requester ID translation table may be a global resource of the switch available to all the ports. Alternatively, the requester ID translation table may be a per port resource or may be designated for a particular group of ports as required. Regardless of the non-transparent bridge architecture selected, in the case of two root complexes, requests from a first domain associated with the first root complex will have their requester ID translated via a match table so that the requester ID of the request is appropriately mapped to the domain associated with the second root complex. Additionally, as the completion resulting from the request flows back through the non-transparent port/function, the reverse translation occurs via the match table to map the requester ID back into the first domain from which the request originated.

With reference to FIG. 1, a PCIe system may include one or more root complex. A first root complex (RC) 100 and a second root complex (RC-0) 120 may be coupled to a PCIe switch 105. To enable non-transparent bridging between the first RC 100 and the second RC 120, a non-transparent port 110 of the PCIe switch 105 may be coupled to the first root complex 100. The switch 105 may further include a plurality of downstream ports 130, each downstream port 130 coupled to one of a plurality of endpoints 150. The second root complex 120 may be coupled to an upstream port 125 of the switch 105.

In a prior art implementation, a request 175 originating at an endpoint 150 may have a REQID=X 160, wherein the requester ID 160 is the device ID of endpoint EP-X 150. As is known in the art, the requester ID of EP-X 150 may be assigned to EP-X 150 via bus enumeration initiated by the root complex, RC-0 120. The requester ID (REQID) of each endpoint 150 may consist of three fields; bus, device and function, or BDF. To map the request initiated at endpoint 150 of the domain of RC-0 120 to the domain of RC 100, the requester ID 160 of the endpoint from which the request originated is used to search the requester ID match table, at the non-transparent port 110, in an effort to identify a match. The requester ID match table associated with the non-transparent port 110 may comprises a plurality of entries and each entry in the table may be compared to the REQID=X 160 of the endpoint 150 to identify a match. If a match is identified for the REQID=X 160 in the requester ID match table associated with the non-transparent port 110 of the switch 105, the index (i.e. table entry number) from the requester ID match table is used in place of the device and function (DEV-FUN) number of the REQID=X 160 to generate the REQID=X' 165, thereby mapping the request from the domain of RC-0 120 into the domain of RC 100. After the request 175 is received at the RC 100, a completion 170 is generated by the RC 100 to be returned to the endpoint 150. To route the completion 170 to the endpoint 150, the DEV-FUN number is used to the index the requester ID match table to return the full REQID=X 160, which is the original requester ID of the request.

Figure 2:
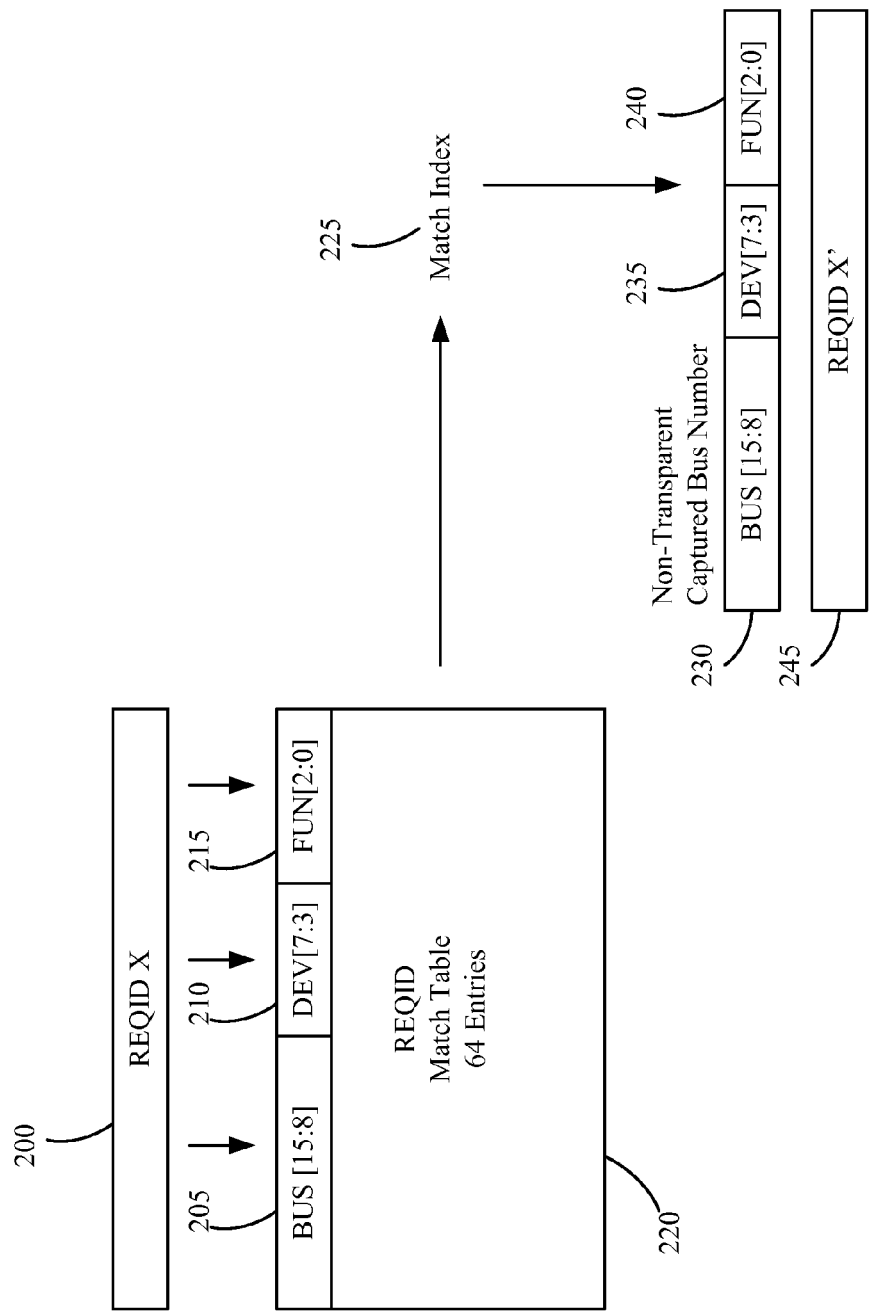
FIG. 2 is a diagram illustrating a requester ID match table used to route requests and completions through the PCIe switch in accordance with an embodiment of the present invention.

FIG. 2 illustrates a detailed view of the requester ID match table associated with the non-transparent port 110 of switch 105. As shown in FIG. 2, the requester ID X 200 comprises a BUS 205, DEV 210 and FUN 215 number. The requester ID X 200 is used to search the requester ID match table 220. In this exemplary embodiment, there are 64 entries in the requester ID match table 220, wherein the 6 least significant bits (LSBs) are used for the DEV-FUN number and the upper 2 bits are filled with a constant. Each of the 64 entries in the table 220 is compared to the REQID X 200 in an attempt to identify a match. If a match is identified, the match index (table entry number) 225 is used for the DEV 235 and FUN 240 number to generate the REQID X' 245. The BUS number 230 of the REQID X' 245 is the captured bus number of the non-transparent port 110, wherein the non-transparent port 110 is seen as an endpoint in the RC 100 domain.

To support multiple processors and multiple root complexes in a PCIe system, multiple PCIe switches may be coupled together. As illustrated with reference to FIG. 3, multiple PCIe switches may be coupled in a cascaded topology. In this particular embodiment, there are four cascaded switches (switch-0 to switch-N) and each switch has 64 requesters, or endpoints, attached to each of their downstream ports. As such, root complex RC 300 is coupled to a non-transparent port 304 of switch-0 302 and root complex RC-0 306 is coupled to an upstream port 308 of switch-0 302. The downstream ports 312, 314 of switch-0 302 are coupled to endpoints 318, 320 and an aggregated downstream port 310 of switch-0 302 is coupled to the non-transparent port 324 of switch-1 322. In operation, the aggregated downstream port 310 of switch-0 302 receives requests from switch-1 322. While only downstream ports 312, 314 and 310 of switch-0 302 are illustrated, as previously described, switch-0 302 may comprise up to 64 downstream ports, each coupled to an endpoint or requester of the PCIe system. Additionally, switch-1 322 may comprise an upstream port 328 coupled to root complex RC-1 326, a non-transparent port 324 coupled to a downstream port 310 of switch-0 302, a plurality of downstream ports 332, 334 coupled to a plurality of endpoints 338, 340 and an aggregated downstream port 330 coupled to a non-transparent port 346 of switch-N 344. Switch-N 344 may comprise an upstream port 348 coupled to root complex RC-N 342 and a plurality of downstream ports 350, 352, 354 coupled to a plurality of endpoints 358, 360. In operation, the aggregated downstream port 330 of switch-1 322 receives requests from switch-N 344.

Figure 3:
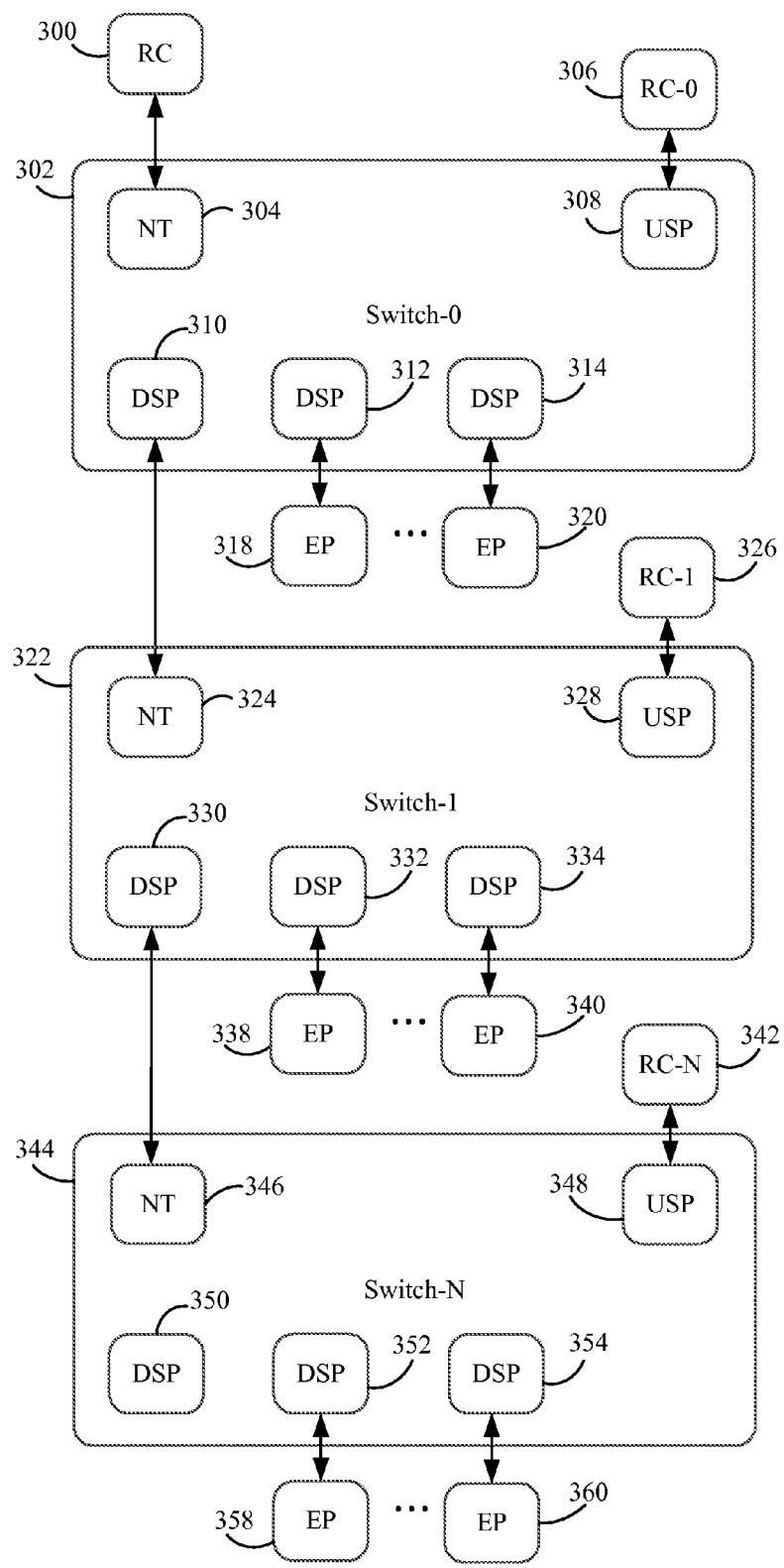
FIG. 3 is a diagram illustrating a PCIe system employing a cascaded switch topology in accordance with an embodiment of the present invention.

As such, in the cascaded topology illustrated in FIG. 3, assuming N=4 and there are 4 cascaded PCIe switches comprising the PCIe system, switch-0 302 would require 64*4=256 requester IDs in the requester ID match table in order to map requests and completions between the 4 PCIe switches and their associated root complexes. Accordingly, as additional PCIe switches are added to the PCIe hierarchy, the size of requester ID match table of switch-0 302 will need to be increased to accommodate the table entries resulting from the additional switches below switch-0 302 in the hierarchy. While switches further down in the hierarchy will actually require fewer table entries, requester ID match tables are typically designed to account for the largest table required by the PCIe system. As such, the size of the requester ID match table will continue to increase as additional switches and root complexes are added to the system. Large tables are undesirable because additional embedded memory is required to store the tables.

In an additional embodiment, illustrated with reference to FIG. 4, the PCIe switches may be coupled together in a tree topology. In this embodiment, switch-0 402 may comprise an upstream port 406 coupled to root complex RC-0 404, a non-transparent port 405 coupled to root complex RC 400, a plurality of downstream ports 410, 412 coupled to a plurality of endpoints 418, 420, a first aggregated downstream port 408 coupled to a non-transparent port 426 of switch-1 428, a second aggregated downstream port 414 coupled to a non-transparent port of switch-2 458 and a third aggregated downstream port 416 coupled to a non-transparent port 432 of switch-N 434. In this embodiment, switch-0 402 receives requests from switch-1 428 at the first aggregated downstream port 408. Additionally, switch-0 402 receives requests from switch-2 458 at the second aggregated downstream port 414 and from switch-N at the third aggregated downstream port 416. Switch-1 428 may further comprise an upstream port 424 coupled to root complex RC-1 422 and a plurality of downstream ports 438, 440 coupled to a plurality of endpoints 442, 444. Switch-2 458 may further comprise an upstream port 462 coupled to root complex RC-2 456 and a plurality of downstream ports 466, 464 coupled to a plurality of endpoints 468, 470. Switch-N 434 may further comprise an upstream port 436 coupled to root complex RC-N 430 and a plurality of downstream ports 446, 448, 450 coupled to a plurality of endpoints 452, 454.

Figure 4:
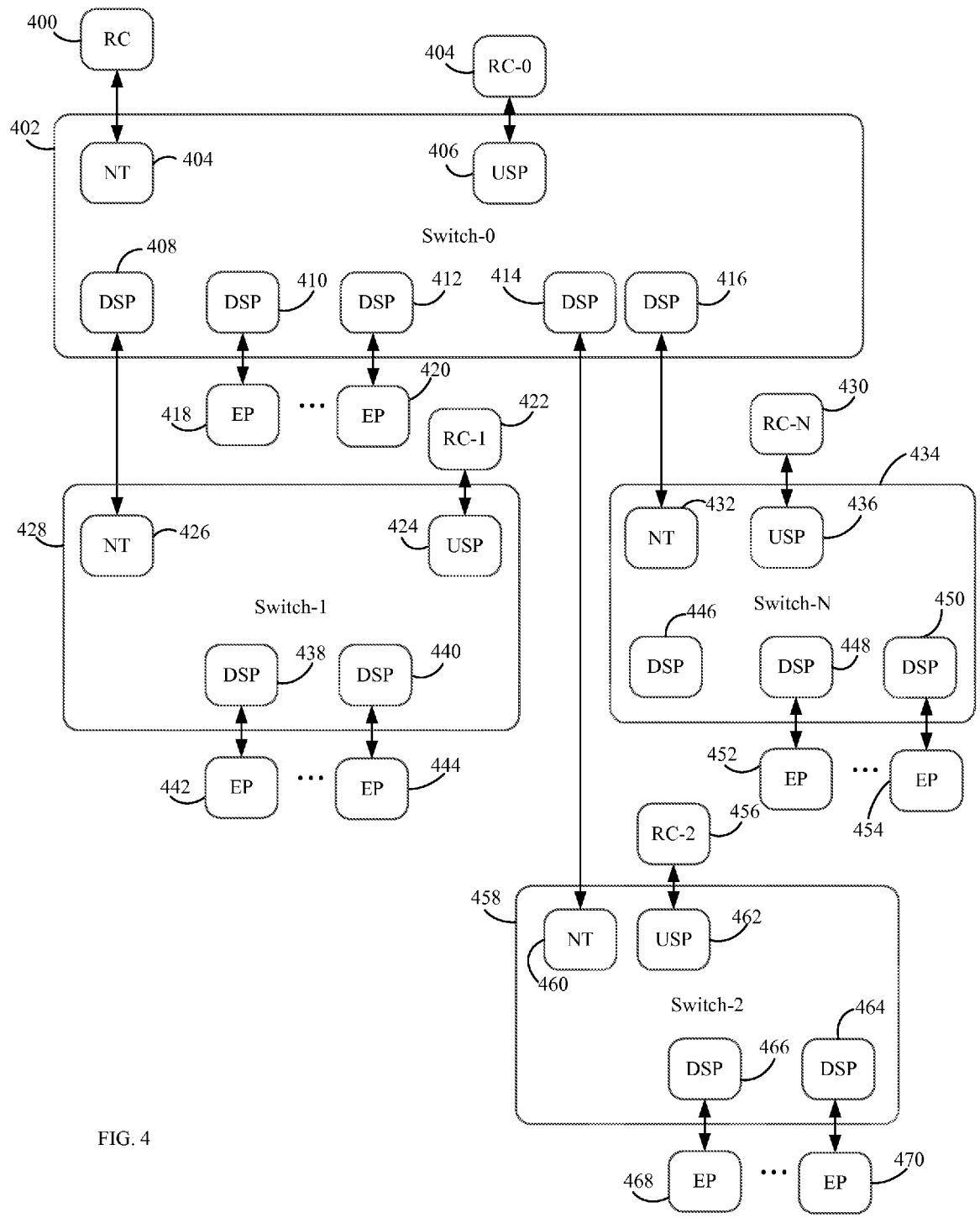
FIG. 4 is a diagram illustrating a PCIe system employing a tree switch topology in accordance with an embodiment of the present invention.

As such, in the tree topology illustrated in FIG. 4, assuming N=4 and there are 4 switches coupled in a tree topology comprising the PCIe system, switch-0 402 would require 64*4=256 requester IDs in the match table in order to map requests and completions between the 4 PCIe switches and their associated root complexes. Accordingly, as additional PCIe switches are added to the PCIe hierarchy, the size of the requester ID match table of switch-0 402 will need to be increased to accommodate the table entries resulting from the additional switches below switch-0 402 in the hierarchy. While switches further down in the hierarchy may actually require fewer table entries, requester ID match tables are typically designed to account for the largest table required by the PCIe system. As such, the size of the requester ID match table will continue to increase as additional switches and root complexes are added to the system. Large tables are undesirable because additional embedded memory is required to store the tables.

In order to reduce the required table entries for the non-transparent port of the PCIe switch, an aggregated downstream port may be incorporated into the PCIe switch. In the present invention, a first PCIe switch includes an aggregated downstream port that is coupled to the non-transparent port of the second PCIe switch that is below the first PCIe switch in the hierarchy. As such, with reference to FIG. 3, the downstream port 310 of switch-0 302 is an aggregated downstream port that is coupled to the non-transparent port 324 of switch-1 322 and the downstream port 330 of switch-1 322 is an aggregated downstream port that is coupled to the non-transparent port 346 of switch-N 344. Since switch-N 344 is the last switch in the hierarchy, switch-N 344 may not include an aggregated downstream port. Similarly, with reference to FIG. 4, the downstream port 408 of switch-0 402 is an aggregated downstream port that is coupled to the non-transparent port 426 of switch-1 428, the downstream port 414 of switch-0 402 is an aggregated downstream port that is coupled to the non-transparent port 460 of switch-2 458 and the downstream port 416 of switch-0 402 is an aggregated downstream port that is coupled to the non-transparent port 432 of switch-N 434. In addition to the cascaded topological hierarchy illustrated in FIG. 3 and the tree topological hierarchy illustrated in FIG. 4, hybrid switch hierarchies incorporating both the cascade topology of FIG. 3 and the tree topology of FIG. 4 are within the scope of the present invention.

The incorporation of an aggregated downstream port into the PCIe switch allows for a reduction in the number of table entries required in the requester ID match table necessary to map requests between two or more different root complexes. In general, only requests from endpoints that are locally attached to a downstream port of a PCIe switch of the present invention require a match table entry in the requester ID match table to route the request. Alternatively, requests received on an aggregated downstream port of the PCIe switch having an address that targets the non-translated port of the PCIe switch are routed based upon an aggregated requester ID comprising the captured bus number of the non-translated port from which the request originated and a aggregated switch number assigned to each of the PCIe switches in the hierarchy. As such, the requester ID match table of the present invention does not require a unique entry for every endpoint of each PCIe switch in the hierarchy and the size of the requester ID match table can be reduced.

Figure 5:
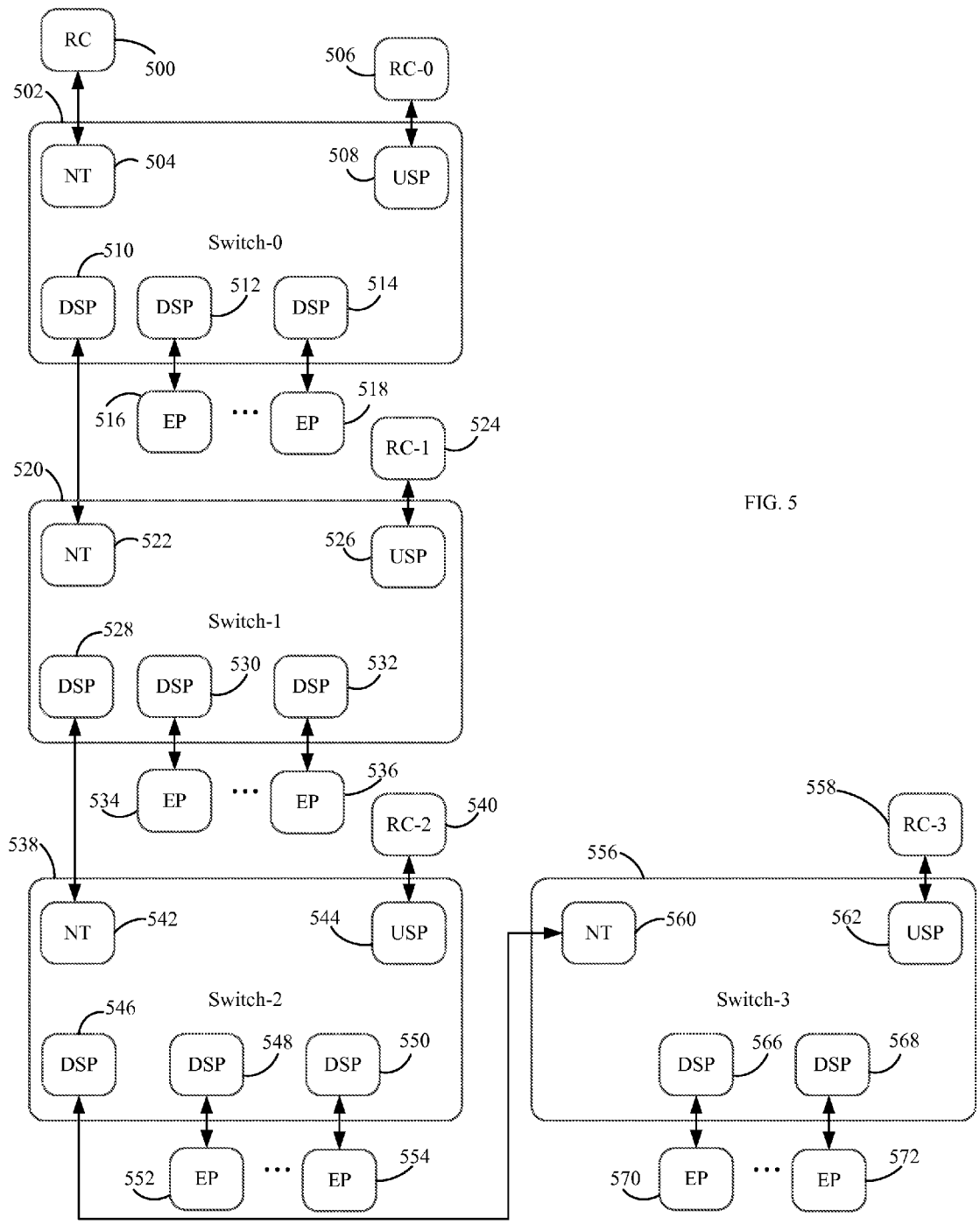
FIG. 5 is a diagram illustrating a PCIe system employing four cascaded switches in accordance with an embodiment of the present invention.

FIG. 5 illustrates a cascaded switch in accordance with an embodiment of the present invention having three PCIe switches. The cascaded switch topology of this embodiment services requests from root complex RC-3 558 which is coupled to switch-3 556 through upstream port 562, root complex RC-2 540 which is coupled to switch-2 538 through upstream port 544, root complex RC-1 524 which is coupled to switch-1 520 through upstream port 526 and root complex RC-0 506 which is coupled to switch-0 502 through upstream port 508. In accordance with the present invention, only the endpoints that are locally attached to a PCIe switch will require a requester ID match table entry for that switch. More specifically, only endpoints 516, 518 that are locally attached to switch-0 502 through downstream ports 512 and 514 will require a requester ID match table entry in the requester ID match table of switch-0 502, only endpoints 534, 536 locally attached to switch-1 520 through downstream ports 530 and 532 will require a requester ID match table entry in the requester ID match table for switch-1 520, only endpoints 552, 554 locally attached to switch-2 538 through downstream ports 548 and 550 will require a requester ID match table entry in the requester ID match table for switch-2 538 and only endpoints 570, 572 locally attached to switch-3 556 through downstream ports 566 and 568 will require a requester ID match table entry in the requester ID match table for switch-3 556. The downstream ports that are locally attached to an endpoint may be generally referred to as non-aggregated downstream ports.

In operation, requests that target the non-transparent port of a switch that are generated by locally attached endpoints and that are received on the downstream ports of the switches will have their requester ID mapped using the requester ID match table. As previously described with reference to FIG. 2, the bus number used to access the requester ID match table is the captured bus number of the non-transparent port on which the request is received. As such, with reference to FIG. 5, requests received on non-aggregated downstream ports 512 and 514 of switch 0 502 will have their requester IDs mapped using the requester ID match table of switch-0 502. Similarly, requests received on downstream ports 530 and 532 of switch-1 520 will have their requester IDs mapped using the requester ID match table of switch-1 520, requests received on downstream ports 548 and 550 of switch-2 538 will have their requester IDs mapped using the requester ID match table of switch-2 538 and requests received on downstream ports 566 and 568 will have their requester IDs mapped using the requester ID match table of switch-3 556.

In order to provide requester ID translation between the multiple root complexes of the system, aggregated downstream ports are used in the cascaded PCIe switch topology. The aggregated downstream port of a PCIe switch is coupled to the non-transparent port of a PCIe switch below it in the switch topology. As such, aggregated downstream port 510 of switch-0 502 receives aggregated non-transparent requests from non-transparent port 522 of switch-1, aggregated downstream port 528 of switch-1 520 receives aggregated non-transparent requests from non-transparent port 542 of switch-2 538 and downstream port 546 of switch-2 538 receives aggregated non-transparent requests from non-transparent port 560 of switch-3 556. Switch-3 556 does not receive any aggregated non-transparent requests because it is the last switch in the hierarchy.

Figure 6:
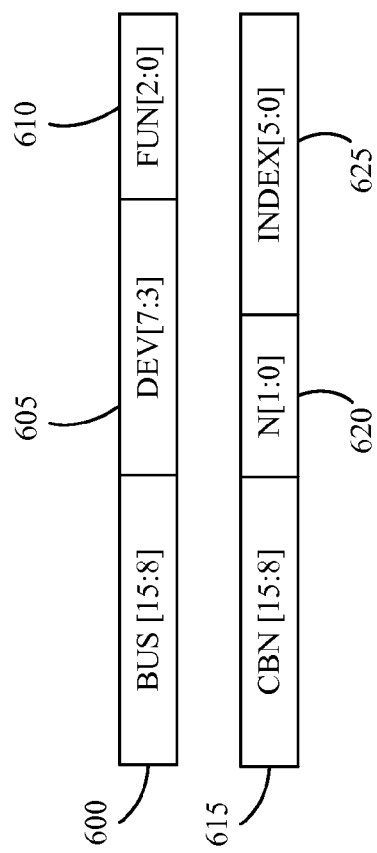
FIG. 6 is a diagram illustrating a requester ID and translated requester ID in accordance with an embodiment of the present invention.

In operation, a request from a non-transparent port that is received on an aggregated downstream port of a switch will have an aggregated requester ID that comprises the captured bus number (CBN) of the non-transparent port, an aggregated switch number and a requester ID match table index. As shown with reference to FIG. 6, the bus BUS [15:8] 600, device DEV [7:3] 605 and function FUN [2:0] 610 of an aggregated requester ID received at an aggregated downstream port of a switch will comprise a captured bus number CBN [15:8] 615 an aggregated switch number N [1:0] 620 and an index INDEX [5:0] 625. As such, the DEV-FUN of the aggregated requester ID is comprised of N [1:0] 620 and the match table index INDEX [5:0] 625.

In the exemplary embodiment of FIG. 5, for switch-3 556, N=0 for all endpoints 570, 572 directly attached to switch-3 556 and there are no aggregated non-transparent requests because switch-3 556 is the last switch in the hierarchy. For switch-2 538, N=0 for all endpoints 552, 554 directly attached to switch-2 538 and for requests received on the aggregated downstream port 546 of switch-2 538, the aggregated switch number N of the requester ID is incremented by 1 and the requests are routed out of the non-transparent port 542 of switch-2 538. For switch-1 520, N=0 for all endpoints 534, 536 directly attached to switch-1 520 and for requests received on the aggregated downstream port 528 of switch-1 520, the aggregated switch number N of the requester ID is incremented by 1 and the requests are routed out of the non-transparent port 522 of switch-1 520. For switch-0 502, N=0 for all endpoints 516, 518 directly attached to switch-0 502 and for requests received on the aggregated downstream port 510 of switch-1 502, the aggregated switch number N of the requester ID is incremented by 1 and the requests are routed out of the non-transparent port 504 to root complex RC 500. So, now requests that are sent to root complex RC 500 from switch-0 502 will have the following: (1) for requests from switch-0, N=0; (2) for requests from switch-1, N=1; (3) for requests from switch-2, N=2; (4) for requests from switch-3, N=3.

Incrementing the aggregated switch number N is useful in a cascaded system as shown in FIG. 5, however in order to provide aggregated non-transparent requester ID translation for other topologies, such as the tree topology shown in FIG. 4, a different mapping function will be needed. The mapping function is programmable based upon the topology of the system and while it is often difficult for the system software to be aware of the location of each switch in the hierarchy at boot time, the mapping function will be the same for each switch in the hierarchy and as such, the location of the switches in the hierarchy is not necessary to implement the mapping function for the aggregated switch number. In general, a small programmable bus mapping table implements this mapping function.

Completions flowing from the root complex RC-0 500 back to the various endpoints of the system will require the inverse translation. In the case of the cascaded topology of FIG. 5, the aggregated switch number N will be decremented and only N=0 will result in an index into the requester ID match table.

Figure 7:
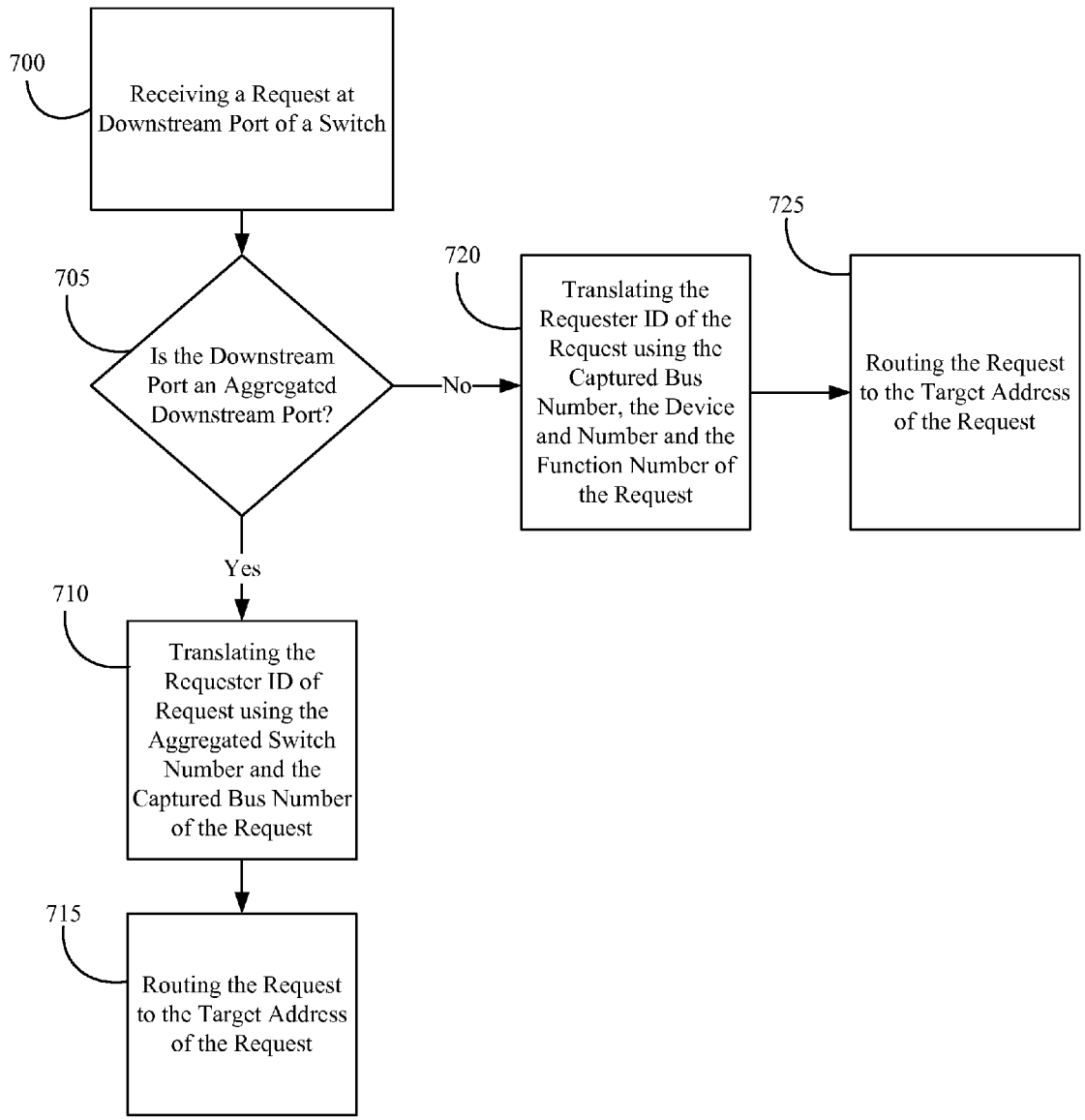
FIG. 7 is a flow diagram illustrating the routing of requests through a PCIe switch in accordance with an embodiment of the present invention.

A method for routing PCIe requests in accordance with an embodiment of the present invention is illustrated with reference to the flow diagram of FIG. 7. In accordance with the PCIe specification, requests are routed by address and in this embodiment, the received request has an address that targets a non-translated port of the switch. The method may include, receiving a request at a downstream port of a switch 700, such as switch-0 502 of FIG. 5, and determining if the downstream port on which the request is received is an aggregated downstream port 705. If the request is received on a downstream port that is not an aggregated downstream port, such as downstream port 512 of FIG. 5, meaning that the request is received from a locally attached endpoint, the requester ID of the request is mapped using the requester ID match table and the bus number is the captured bus number of the non-transparent port 720. The request is then routed to the target address of the request 725. However, if the request is received on a downstream port that is an aggregated downstream port, such as downstream port 510 of FIG. 5, the requester ID of the request is mapped using only the aggregated switch number of the request (N) and the bus mapping table 710. The request is then routed to the target address of the request 715.

Figure 8:
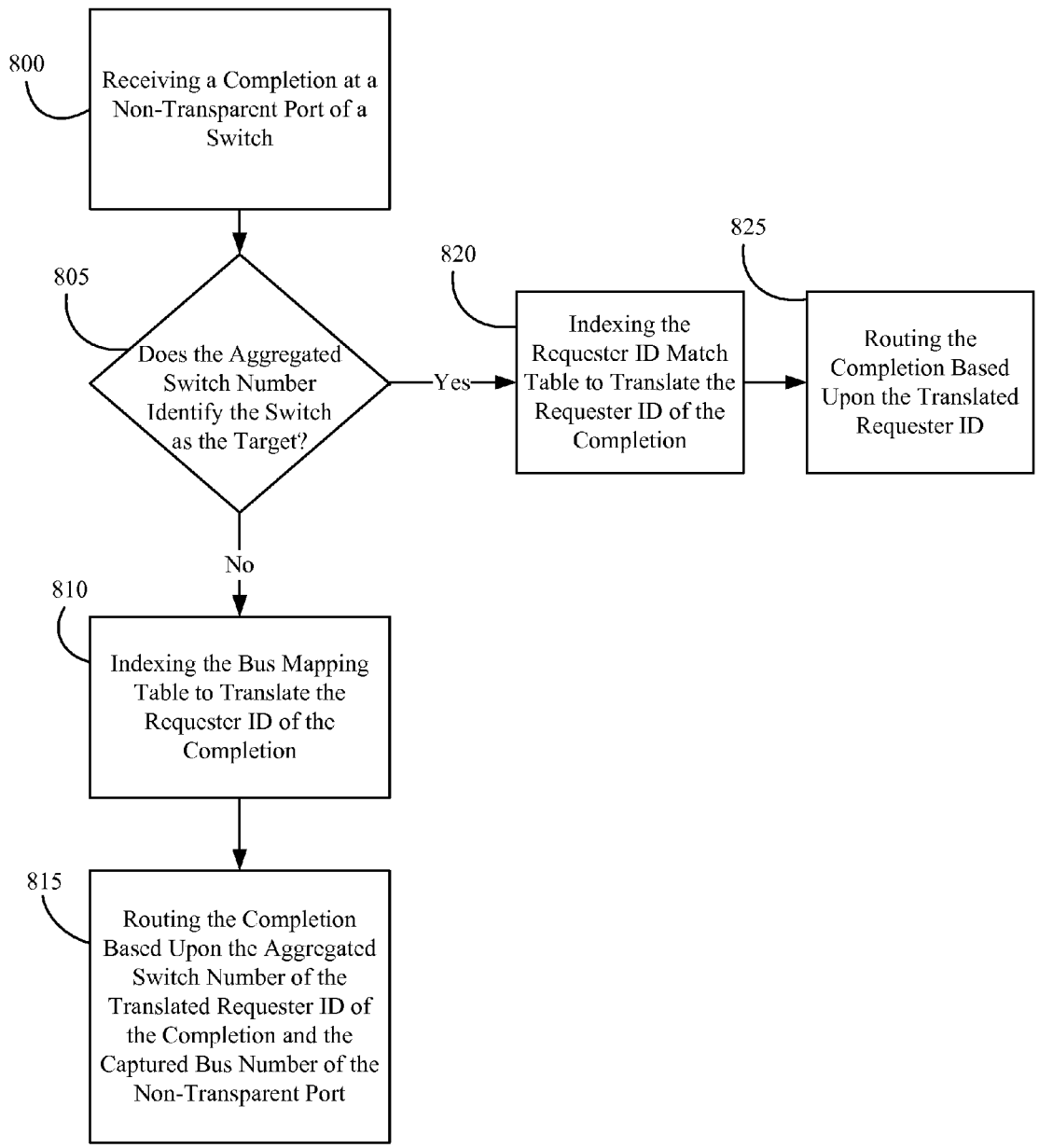
FIG. 8 is a flow diagram illustrating the routing of completions through a PCIe switch in accordance with an embodiment of the present invention.

A method for routing PCIe completions in accordance with an embodiment of the present invention is illustrated with reference to the flow diagram of FIG. 8. In accordance with the PCIe specification, completions are routed by requester ID. Upon receiving a completion at a non-transparent port of a switch 800, such as switch-0 502 of FIG. 5, it is determined if the aggregated switch number (N) of the completion is equal to zero 805, meaning that the aggregated switch number (N) identifies the switch-0 502 as the target for the completion. If the aggregated switch number (N) of the completion is equal to zero, the requester ID of the completion is translated by indexing the requester ID match table 820 of the switch. The completion is then routed based upon the translated requester ID 825. However, if the aggregated switch number (N) of the completion is not equal to zero, the requester ID of the completion is translated by indexing the bus mapping table to yield a new aggregated switch number (N) and the captured bus number used to route the completion 810. The completion is then routed based upon the new aggregated switch number and the captured bus number 815. In the case of the cascaded topology, all aggregated switch numbers (N) not equal to zero would use the same bus number and in the case of multiple downstream ports having aggregated requester IDs flowing up through the switch, each downstream port would have a different bus number, thus each aggregated switch number (N) would map to a different BUS number.

In an additional embodiment, if the total number of requester IDs, including aggregated requester IDs, exceeds 256, then multiple bus numbers may be captured by the non-transparent port. This embodiment allows the aggregated switch number N to encompass the BUS range, i.e. the upper 8 bits of the requester ID.

In various embodiments, the PCIe switch is implemented in an integrated circuit of an integrated circuit device, which may include an integrated circuit package containing the integrated circuit. In some embodiments, the PCIe switch is implemented in a single integrated circuit die. In other embodiments, the PCIe switch is implemented in more than one integrated circuit die of an integrated circuit device which may include a multichip package containing the integrated circuit die.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method for aggregated non-transparent requester ID translation in a system comprising a plurality of PCIe switches, the method comprising:
    receiving a request at a downstream port of a first PCIe switch that targets a non-transparent port of the first PCIe switch, the switch having a requester ID match table that only includes requests from endpoints that are locally attached to a non-aggregated downstream port of the first PCIe switch;
    determining if the downstream port is an aggregated downstream port;
    if the request is received from a non-aggregated downstream port of the first PCIe switch and includes a requester ID including a bus number, device number and function number, mapping the request using the requester ID match table and the requester ID of the request to generate a translated request having a requester ID that includes a requester ID match table index of the request, the requester ID further including an aggregated switch number associated with the first PCIe switch; and
    if the request is received from an aggregated downstream port of the first PCIe switch, the request including a requester ID match table index and an aggregated switch number, mapping the request using the aggregated switch number of the request to generate a translated request having a requester ID that includes the requester ID match table index of the request and an aggregated switch number that is different from the aggregated switch number of the request.

2. The method of claim 1, further comprising:
    receiving a completion at the non-transparent port of the first PCIe switch, the completion including a requester ID and the requester ID further comprising a requester ID match table index and an aggregated switch number; and
    translating the requester ID of the completion by indexing the requester ID match table if the aggregated switch number of the completion identifies the first PCIe switch as the target of the completion, or if the aggregated switch number of the completion does not identify the first PCIe switch as the target of the completion translating the requester ID of the completion using the aggregated switch number of the completion to generate a translated completion having a requester ID that includes the requester ID match table index of the completion and an aggregated switch number that is different from the aggregated switch number of the completion.

3. The method of claim 2, wherein the first PCIe switch further comprises a bus mapping table that comprises aggregated switch number mapping between the first PCIe switch and at least one other PCIe switch of the plurality of PCIe switches in the switch hierarchy, and wherein the mapping the request using the aggregated switch number of the request further comprises mapping the request using only the bus mapping table and the aggregated switch number of the request, and the translating the requester ID of the completion using the aggregated switch number of the completion further comprises indexing the bus mapping table using the aggregated switch number of the completion.

4. The method of claim 2, wherein the first PCIe switch further comprises a bus mapping table that comprises aggregated switch number mapping between the first PCIe switch and at least one other PCIe switch of the plurality of PCIe switches in the switch hierarchy, and wherein the mapping the request using the aggregated switch number of the request further comprises mapping the request using the bus mapping table and the aggregated switch number of the request, and the translating the requester ID of the completion using the aggregated switch number of the completion further comprises indexing the bus mapping table using the captured bus number and the aggregated switch number of the completion.

5. The method of claim 1, wherein the request further comprises a target address that targets the non-transparent port of the first PCIe switch, the method further comprising:
    translating the target address; and
    routing the request to the translated target address.

6. The method of claim 1,
    wherein the different aggregated switch number of the translated request is generated by incrementing or decrementing the aggregated switch number of the request and wherein the different aggregated switch number of the completion is generated by incrementing or decrementing the aggregated switch number of the completion.

7. The method of claim 6, wherein the request includes a captured bus number of the non-transparent port of the first PCIe switch, the method further comprising, routing the completion based upon the translated requester ID and the captured bus number.

8. The method of claim 6, wherein the plurality of PCIe switches are coupled together in a cascaded topology.

9. The method of claim 1, wherein the plurality of PCIe switches are coupled together in a tree topology.

10. The method of claim 1, wherein the first PCIe switch further comprises a bus mapping table that comprises aggregated switch number mapping between the first PCIe switch and at least one other PCIe switch of the plurality of PCIe switches in the switch hierarchy, and wherein the mapping the request using the aggregated switch number of the request further comprises mapping the request using the bus mapping table and the aggregated switch number of the request, and the translating the requester ID of the completion using the aggregated switch number of the completion further comprises indexing the bus mapping table, and further wherein the requester ID match table does not include requests from any endpoints that are attached to other PCIe switches in the plurality of PCIe switches in the switch hierarchy.

11. A PCIe switch for performing aggregated non-transparent requester ID translation, the PCIe switch comprising:
    a requester ID match table that only includes requests from endpoints that are locally attached to a non-aggregated downstream port of the PCIe switch;
    an aggregated downstream port configured to receive a request from a non-transparent port of another PCIe switch within a switch hierarchy comprising the PCIe switch and a plurality of other PCIe switches, the request comprising a requester ID and the requester ID further comprising an aggregated switch number and a requester ID match table index; and
    a non-transparent port of the PCIe switch configured to map the requester ID of the request received at the aggregated downstream port of the PCIe switch using the aggregated switch number and generate a translated request having a translated requester ID that includes the requester ID match table index and an aggregated switch number that is different from the aggregated switch number of the request, configured to translate a completion having a requester ID that includes an aggregated switch number that identifies the PCIe switch as the target of the completion by indexing the requester ID match table, and configured to translate a completion having a requester ID that includes an aggregated switch number that does not identify the PCIe switch as the target of the completion using the aggregated switch number of the completion to generate a translated request having a requester ID that includes the requester ID match table index of the request and an aggregated switch number that is different from the aggregated switch number of the completion.

12. The PCIe switch of claim 11, wherein the PCIe switch further comprises:
    a non-aggregated downstream port configured to receive a request from a locally attached endpoint, the request comprising a requester ID and the requester ID further comprising a captured bus number, a device number and a function number, the non-transparent port further configured to map the requester ID of the request from the locally attached endpoint using the requester ID match table, and the captured bus number, the device number and the function number of the request received from the locally attached endpoint.

13. The PCIe switch of claim 10, wherein the switch hierarchy comprises a plurality of PCIe switches coupled together in a cascaded topology.

14. The PCIe switch of claim 10, wherein the switch hierarchy comprises a plurality of PCIe switches coupled together in a tree topology.

15. The PCIe switch of claim 10, wherein
    the different aggregated switch number of the translated request is generated by incrementing or decrementing the aggregated switch number of the request and wherein the different aggregated switch number of the completion is generated by incrementing or decrementing the aggregated switch number of the completion.

16. A PCIe switch for performing aggregated non-transparent requester ID translation, the PCIe switch comprising:
    a requester ID match table that only includes requests from endpoints that are locally attached to a non-aggregated downstream port of the PCIe switch;

a bus mapping table that comprises aggregated switch number mapping between the first PCIe switch and at least one other PCIe switch of the plurality of PCIe switches in the switch hierarchy;

an aggregated downstream port configured to receive a request from a non-transparent port of another PCIe switch within a switch hierarchy comprising the PCIe switch and a plurality of other PCIe switches, the request including a requester ID comprising an aggregated switch number, a captured bus number and a requester ID match table index; and a non-transparent port of the PCIe switch configured to map the requester ID of the request received at the aggregated downstream port of the PCIe switch using the bus mapping table and the aggregated switch number to generate a translated request having a translated requester ID that includes the requester ID match table index and an aggregated switch number that is different from the aggregated switch number of the request, configured to translate a completion having a requester ID that includes an aggregated switch number that identifies the switch as the target of the completion by indexing a requester ID match table, and configured to translate a completion having a requester ID that includes an aggregated switch number that does not identify the switch as the target of the completion by indexing the bus mapping table to generate a translated request having a requester ID that includes the requester ID match table index of the request and an aggregated switch number that is different from the aggregated switch number of the completion.

17. The PCIe switch of claim 16, wherein the first PCIe switch further comprises:

a non-aggregated downstream port configured to receive a request from a locally attached endpoint, the request comprising a requester ID and the requester ID further comprising a captured bus number, a device number and a function number; and the non-transparent port further configured to translate the requester ID of the request from the locally attached endpoint using the requester ID match table, the captured bus number, the device number and the function number of the request received from the locally attached endpoint.

18. The PCIe switch of claim 16, wherein the switch hierarchy comprises a plurality of PCIe switches coupled together in a cascaded topology.

19. The PCIe switch of claim 16, wherein the switch hierarchy comprises a plurality of PCIe switches coupled together in a tree topology.

* * * * *

UNITED STATES PATENT AND TRADEMARK OFFICE
CERTIFICATE OF CORRECTION

| | | |
|---|---|---|
| PATENT NO. | : 8,917,734 B1 | Page 1 of 1 |
| APPLICATION NO. | : 13/681257 | |
| DATED | : December 23, 2014 | |
| INVENTOR(S) | : David Alan Brown | |

It is certified that error appears in the above-identified patent and that said Letters Patent is hereby corrected as shown below:

In the Claims

In Claim 13, Column 12, Line 50, delete "10" and insert --11--.

In Claim 14, Column 12, Line 53, delete "10" and insert --11--.

In Claim 15, Column 12, Line 56, delete "10" and insert --11--.

Signed and Sealed this
Fifth Day of May, 2015

Michelle K. Lee
*Director of the United States Patent and Trademark Office*